(12) United States Patent
Daudet et al.

(10) Patent No.: US 11,008,753 B2
(45) Date of Patent: May 18, 2021

(54) CORRUGATED BRIDGING MEMBER

(71) Applicant: Simpson Strong-Tie Company, Inc., Pleasanton, CA (US)

(72) Inventors: Larry Randall Daudet, Brentwood, CA (US); Paul Howard Oellerich, Stockton, CA (US)

(73) Assignee: Simpson Strong-Tie Company, Inc., Pleasanton, CA (US)

( * ) Notice: Subject to any disclaimer, the term of this patent is extended or adjusted under 35 U.S.C. 154(b) by 0 days.

(21) Appl. No.: 15/450,878

(22) Filed: Mar. 6, 2017

(65) Prior Publication Data

US 2017/0191254 A1 Jul. 6, 2017

Related U.S. Application Data

(63) Continuation-in-part of application No. 13/802,676, filed on Mar. 13, 2013, now Pat. No. 9,849,497.

(60) Provisional application No. 62/406,346, filed on Oct. 10, 2016.

(51) Int. Cl.
*E04B 2/76* (2006.01)
*F16B 7/04* (2006.01)

(52) U.S. Cl.
CPC ............ *E04B 2/763* (2013.01); *F16B 7/0473* (2013.01); *Y10T 403/50* (2015.01)

(58) Field of Classification Search
CPC . E04B 2/58; E04B 2/62; E04B 2/7457; E04B 2/7453; E04B 2/761; E04B 2/762; E04B 2/763; E04C 3/02; E04C 3/04; E04C 3/07; F16B 7/0473
See application file for complete search history.

(56) References Cited

U.S. PATENT DOCUMENTS

| | | | |
|---|---|---|---|
| 529,154 A | 11/1894 | Banks | |
| 719,191 A | 1/1903 | Collins | |
| 992,941 A | 5/1911 | Danielson | |
| 1,101,745 A | 6/1914 | Jones | |
| 1,346,426 A | 7/1920 | Sherbner | |
| 1,791,197 A * | 2/1931 | Dickson | E04B 2/763 52/243 |

(Continued)

FOREIGN PATENT DOCUMENTS

| | | |
|---|---|---|
| AU | 428738 | 10/1972 |
| DE | 2641667 | 9/1976 |

(Continued)

OTHER PUBLICATIONS

"Bridging, Bracing & Backing: Spazzer 5400 Spacer Bar (SPZS), Bar Guard (SPBG) & Grommet (SPGR)". Clip Express Product Catalog: Clips, Connectors & Framing Hardware, Apr. 2012, p. 77. Clark Dietrich Building Systems, USA.

(Continued)

*Primary Examiner* — Daniel J Wiley
(74) *Attorney, Agent, or Firm* — James R. Cypher; Charles R. Cypher (57) ABSTRACT

A building connection between a plurality of vertical wall studs made with one or more bridging members to brace the wall studs. The one or more bridging members are formed with mounting sections that are received in openings of the wall studs and the mounting sections are bracketed by end sections where bridging members can overlap. The bridging members interface with the web of the wall studs to brace them.

20 Claims, 12 Drawing Sheets

(56) References Cited

U.S. PATENT DOCUMENTS

| | | |
|---|---|---|
| 2,365,501 A | 12/1944 | Walstrom |
| 2,873,828 A | 2/1959 | Zitomer |
| 2,900,677 A | 8/1959 | Yetter |
| 2,905,426 A | 9/1959 | Ross |
| 2,918,995 A | 12/1959 | Kruger |
| 3,083,794 A * | 4/1963 | Stovall, Jr. ............... E04B 2/62 52/364 |
| 3,102,306 A | 9/1963 | Hutchinson |
| 3,126,928 A | 3/1964 | McMillan |
| 3,299,839 A | 1/1967 | Nordbak |
| 3,322,447 A * | 5/1967 | Biggs ................. E04B 2/763 403/252 |
| 3,482,369 A | 12/1969 | Burke |
| 3,490,604 A | 1/1970 | Klein |
| 3,590,543 A | 7/1971 | Heirich |
| 3,606,227 A | 9/1971 | Klein |
| 3,653,172 A * | 4/1972 | Schwartz ................. E04B 2/62 52/669 |
| 3,778,952 A | 12/1973 | Soucy |
| 3,858,988 A | 1/1975 | Cohen |
| 3,875,719 A | 4/1975 | Menge |
| 3,897,163 A | 7/1975 | Holmes |
| 4,018,020 A | 4/1977 | Sauer et al. |
| 4,027,453 A | 6/1977 | Bridge |
| 4,043,689 A | 8/1977 | Spencer et al. |
| 4,075,810 A | 2/1978 | Zakrzewski et al. |
| 4,128,979 A | 12/1978 | Price |
| 4,140,417 A | 2/1979 | Danielsen et al. |
| 4,157,002 A | 6/1979 | Adolph |
| 4,174,911 A | 11/1979 | Maccario et al. |
| 4,208,851 A | 6/1980 | Sauer |
| 4,235,054 A | 11/1980 | Cable et al. |
| 4,246,736 A | 1/1981 | Kovar et al. |
| 4,339,903 A | 7/1982 | Menge |
| 4,370,843 A | 2/1983 | Menge |
| 4,406,374 A | 9/1983 | Yedor |
| 4,426,822 A | 1/1984 | Gailey |
| 4,428,172 A | 1/1984 | Larsson |
| 4,448,004 A | 5/1984 | Thorsell |
| 4,464,074 A | 8/1984 | Green et al. |
| 4,516,874 A | 5/1985 | Yang et al. |
| 4,522,009 A | 6/1985 | Fingerson |
| 4,586,841 A | 5/1986 | Hunter |
| 4,625,415 A | 12/1986 | Diamontis |
| 4,693,047 A | 9/1987 | Menchetti |
| 4,791,766 A | 12/1988 | Egri, II |
| 4,809,476 A | 3/1989 | Satchell |
| 4,840,005 A | 6/1989 | Cochrane |
| 4,850,169 A | 7/1989 | Burkstrand et al. |
| 4,858,407 A | 8/1989 | Smolik |
| 4,864,791 A | 9/1989 | Platt |
| 4,912,894 A | 4/1990 | Platt |
| 4,914,878 A | 4/1990 | Tamaki et al. |
| 4,916,877 A | 4/1990 | Platt |
| 4,951,436 A | 8/1990 | Burkstrand et al. |
| 5,092,100 A | 3/1992 | Lambert et al. |
| 5,127,760 A | 7/1992 | Brady |
| 5,155,962 A | 10/1992 | Burkstrand et al. |
| 5,189,857 A | 3/1993 | Herren et al. |
| 5,274,973 A | 1/1994 | Liang |
| 5,287,664 A | 2/1994 | Schiller et al. |
| 5,315,803 A | 5/1994 | Turner |
| 5,325,651 A | 7/1994 | Meyer et al. |
| 5,363,622 A | 11/1994 | Sauer |
| 5,390,453 A | 2/1995 | Untiedt |
| 5,403,110 A | 4/1995 | Sammann |
| 5,446,969 A | 9/1995 | Terenzoni |
| 5,454,203 A | 10/1995 | Turner |
| 5,600,926 A | 2/1997 | Ehrlich |
| 5,605,024 A | 2/1997 | Sucato et al. |
| 5,632,128 A | 5/1997 | Agar |
| 5,664,392 A | 9/1997 | Mucha |
| 5,669,198 A | 9/1997 | Ruff |
| 5,671,580 A | 9/1997 | Chou |
| 5,682,935 A | 11/1997 | Bustamante |
| 5,697,725 A | 12/1997 | Ballash et al. |
| 5,720,138 A | 2/1998 | Johnson |
| 5,784,850 A | 7/1998 | Elderson |
| 5,876,006 A | 3/1999 | Sharp et al. |
| 5,899,041 A | 5/1999 | Durin |
| 5,904,023 A | 5/1999 | diGirolamo et al. |
| 5,921,411 A | 7/1999 | Merl |
| 5,943,838 A | 8/1999 | Madsen et al. |
| 5,964,071 A | 10/1999 | Sato |
| 6,021,618 A | 2/2000 | Elderson |
| 6,164,028 A | 12/2000 | Hughes |
| 6,199,336 B1 | 3/2001 | Poliquin |
| 6,199,341 B1 | 3/2001 | Carlin et al. |
| 6,242,698 B1 | 6/2001 | Baker, III et al. |
| 6,260,318 B1 | 7/2001 | Herren |
| 6,290,214 B1 | 9/2001 | DeSouza |
| 6,301,854 B1 | 10/2001 | Daudet et al. |
| 6,315,137 B1 | 11/2001 | Mulford |
| 6,418,695 B1 | 7/2002 | Daudet et al. |
| D463,575 S | 9/2002 | Daudet et al. |
| 6,578,335 B2 | 6/2003 | Poliquin |
| 6,644,603 B2 | 11/2003 | Bailleux |
| 6,662,520 B1 | 12/2003 | Nelson |
| 6,688,069 B2 | 2/2004 | Zadeh |
| 6,702,270 B1 | 3/2004 | Reschke |
| 6,708,460 B1 | 3/2004 | Elderson |
| 6,739,562 B2 | 5/2004 | Rice |
| 6,748,705 B2 | 6/2004 | Orszulak |
| 6,792,733 B2 | 9/2004 | Wheeler et al. |
| 7,017,310 B2 * | 3/2006 | Brunt ................. E04B 2/7457 174/66 |
| 7,021,021 B2 | 4/2006 | Saldana |
| 7,104,024 B1 | 9/2006 | diGirolamo et al. |
| 7,168,219 B2 | 1/2007 | Elderson |
| 7,174,690 B2 | 2/2007 | Zadeh |
| D558,039 S | 12/2007 | Skinner |
| D573,873 S | 7/2008 | Wall |
| 7,398,621 B2 | 7/2008 | Banta |
| 7,451,573 B2 | 11/2008 | Orszulak et al. |
| 7,503,150 B1 | 3/2009 | diGirolamo et al. |
| 7,520,100 B1 | 4/2009 | Herrman et al. |
| 7,559,519 B1 | 7/2009 | Dragic et al. |
| 7,596,921 B1 | 10/2009 | diGirolamo et al. |
| 7,634,889 B1 | 12/2009 | diGirolamo et al. |
| 7,739,850 B2 | 6/2010 | Daudet |
| 7,836,657 B1 | 11/2010 | diGirolamo et al. |
| 7,955,027 B2 | 6/2011 | Nourian et al. |
| 8,011,160 B2 | 9/2011 | Rice |
| D648,249 S | 11/2011 | Noble et al. |
| 8,083,187 B2 | 12/2011 | Bernard et al. |
| D657,891 S | 4/2012 | Jones |
| 8,167,250 B2 | 5/2012 | White |
| 8,205,402 B1 | 6/2012 | diGirolamo et al. |
| 8,225,581 B2 | 7/2012 | Strickland et al. |
| D667,249 S | 9/2012 | London |
| D667,718 S | 9/2012 | Preda |
| 8,387,321 B2 | 3/2013 | diGirolamo et al. |
| D692,746 S | 11/2013 | Lawson et al. |
| 8,590,255 B2 * | 11/2013 | Daudet ................. E04B 1/1903 52/243 |
| 8,683,772 B2 | 4/2014 | Friis |
| 10,422,136 B2 | 9/2019 | LeBlang |
| 10,731,355 B2 | 8/2020 | Haddock et al. |
| 2002/0059773 A1 * | 5/2002 | Elderson ................. E04B 2/58 52/667 |
| 2003/0037494 A1 * | 2/2003 | Collins ................. E04B 2/7457 52/220.7 |
| 2003/0106280 A1 * | 6/2003 | diGirolamo ........... E04B 2/7457 52/656.1 |
| 2003/0145537 A1 | 8/2003 | Bailey |
| 2003/0167722 A1 | 9/2003 | Klein et al. |
| 2004/0031224 A1 * | 2/2004 | Elderson ................. E04B 2/7457 52/481.1 |

(56) References Cited

U.S. PATENT DOCUMENTS

| | | | |
|---|---|---|---|
| 2007/0251186 A1 | 11/2007 | Rice | |
| 2015/0033662 A1* | 2/2015 | Daudet | ............... E04C 3/07 52/696 |

FOREIGN PATENT DOCUMENTS

| | | |
|---|---|---|
| EP | 2395168 | 6/2011 |
| JP | 61-20809 | 2/1986 |
| JP | 2013-40438 | 2/2013 |
| WO | WO93/24712 | 9/1993 |
| WO | WO96/23954 | 8/1996 |

OTHER PUBLICATIONS

"Metal-Lite Products". Metal Lite website, metal-lite.net. Accessed Sep. 20, 2013, one page Metal Lite 2012, USA.
"Mantisgrip Product Catalog 2012". Catalog, 2012, 10 pages and cover. Mantisgrip 2012, USA.
"Wall Bridging Detail". NuconSteel Product Catalog, 2003, front cover, table of contents, p. 34. NuconSteel., USA.
"Double Deep-Leg Track", "Bridge Clip Installation", "BC600 & BC800 Installation", "BridgeBar", "BridgeClip", "BC600 or BC800". The Steel Network, Inc. Product Catalog, Jan. 2004, front cover, p. 11, 27, 49. Steel Network, Inc., USA.
European Search Report, Patent Application 17195707.9, Patent prosecution document, Dec. 14, 2017, 7 pages, European Patent Office, Munich, Germany.
"Construction Dimensions", Apr. 2012, cover page and Simpson Strong-Tie/SUBH advertisement page, SFCFS12-E, Association of the Wall and Ceiling Industry (AWCI), USA.
"SUBH/MSUBH: Bridging Connectors for Cold-Formed Steel Stud Construction", Simpson Strong-Tie Company flier, Apr. 1, 2012, 2 pages, S-SUBHMSUBH12, Simpson Strong-Tie Company, Inc., Pleasanton, CA, USA.

\* cited by examiner

CORRUGATED BRIDGING MEMBER

BACKGROUND OF THE INVENTION

The present invention relates to steel stud building wall systems and especially to an apparatus for stabilizing steel studs to prevent lateral movement and torsion in such systems.

Many buildings are constructed with steel stud wall framing. When a wall is built with any kind of stud, wood or steel, it is generally desirable to fix sequential studs relative to each other against lateral movement and torsion. In steel-stud walls, an elongated steel bridging member is typically inserted horizontally through pre-punched openings in a series of vertical studs for this purpose. Steel studs have excellent columnar strength when they are straight, but a significant portion of that strength is lost if the studs are twisted. Because steel studs are particularly vulnerable to torsion, the bridging members, which are typically channel-shaped and have a horizontal web and two vertical side flanges, are made to closely fit the openings in the vertical studs in order to maximize torque resistance. In additional to mechanical torque, metal studs can twist or bend in response to the heat of a fire when the drywall sheathing, which acts as a firebreak, is destroyed. When metal studs twist or bend, they lose their weight-bearing capacity, multiplying the damage caused directly by fire.

While channel-shaped bridging members closely received in the openings can help restrain the studs from twisting, some twisting can still occur and the studs can still shift or bend parallel to the wall. A variety of sheet metal brackets, beginning with a simple right angle, are used with channel-shaped bridging members to prevent this shifting or bending. These brackets can be connected to the studs and the bridging member by means of separate fasteners, interlocking sections built into the bracket, or a combination of fasteners and interlocking forms.

The prior art also includes short bridging members that span only adjacent studs and have ends tailored for fastening to the wall studs and/or to each other through extensions that are inserted through the openings in the wall studs. These bridging members are typically a fixed length. U.S. Pat. No. 6,164,028, granted to John P. Hughes, teaches a system of connecting such short bridging members by forming one end of the web of each bridging member to extend through the opening in the stud and to closely receive the central web of the stud on both sides, and then attach to the end of another bridging member.

The prior art also includes elongated bridging members with a series of slots that allow the bridging member to not only be inserted through the openings in the wall studs but also mate with the central web of the wall studs on either side of the openings. U.S. Pat. No. 7,168,219, granted to William L. Elderson, teaches such bridging members.

It is an object of the present invention to provide bridging members that can be installed quickly in a variety of wall environments and that can form a strong connection that resists both lateral and torsional loads.

SUMMARY OF THE INVENTION

The present invention provides a bridging member that when used in series with other bridging members firmly connects and stabilizes a building wall made up of steel studs. The bridging members pass through openings in each of the studs in the section of the wall. The bridging members are designed to keep the studs in alignment along the length of the wall when they are installed through the studs.

The present invention provides a bridging member with mounting sections having notches that interlock with the central web of a wall stud to provide torsional rigidity. The notches are braced by the body of the bridging member, allowing the notches to resist substantially high loads.

In the present invention, a first stud and additional laterally spaced studs are connected and braced by at least a first bridging member and possibly a second. The studs are provided with a front face and an opposite face disposed laterally therefrom on the opposed face with an opening therethrough that communicates between the front face and the opposite face. The additional studs are disposed substantially parallel to and spaced selected distances away from the first stud.

In the present invention, at least one bridging member is provided to engage and be received through the openings in the first and second studs respectively, and preferably more than two studs. The bridging member has a longitudinal, central axis with multiple mounting sections along the longitudinal, central axis and opposed first and second end sections along the longitudinal, central axis. The mounting sections of the bridging member are received in the openings of the studs. The bridging members are channel-shaped throughout their longitudinal length, having a web and flaring side walls. The flaring side walls are disposed at non-orthogonal angles to the web and flare outwardly from the web. Connected to the flaring side walls are outer flanges that are generally parallel to the web of the bridging member and are preferably in alignment with each other.

The first end section of an additional bridging member is available to overlap and be connected to the second end section of the first bridging member made according to the present invention. The first end section of the first bridging member is available to overlap and be connected to the second end section of another bridging member.

According to the present invention, the bridging members making the connections between the plurality of studs are provided with multiple mounting sections. Each mounting section has a first body part and a second body part connected thereto by means of a neck which can fit through the opening in a stud. The first and second body parts each have a first inner edge with a first web interface portion and a second web interface portion, and when the bridging member engages a wall stud the first inner edges of the first and second body parts contact or are disposed closely adjacent to the central web of a stud on the opposed faces of the stud.

The present invention employs a bridging connector with longitudinally-offset notches that create a tighter interface with the central web of the wall stud and therefore result in improved performance in the connection.

In one embodiment of the present invention, the first and second body parts on either side of the neck are similarly shaped. According to the present invention, the shape of the first and second ends of the bridging members are substantially similar to the mounting sections.

In one embodiment of the present invention, the notches of the mounting section are formed with a shape that makes for a stronger die punch that will last longer. The inner edges of the first and second body parts are formed with sections having a curved arc such that the punch can be larger and is thus stronger. The inner edges of the first and second bodies of the notches can also be shaped so that one of the first and second inner edges flares outwardly as it nears the outer end of the notch. This feature makes it easier to engage the notches with the central web of the stud.

The present invention also encompasses making the connection between a plurality of studs with one or more of the bridging members of the present invention, wherein the first body parts of one or more bridging members are placed adjacent the central web of a plurality of wall studs so that the first inner edges of the first body parts are adjacent the central web of the studs.

According to the present invention, the bridging member can be a variety of lengths. Preferably, the mounting sections are provided at selected locations along the bridging members that correspond to spanning standard spacings between adjacent studs.

The interlocking connection between the bridging members and the wall studs allow the bridging members to be firmly connected to the wall studs without the use of fasteners.

BRIEF DESCRIPTION OF THE DRAWINGS

FIG. 6 is an end view of the bridging member of the present invention shown in FIG. 1. The opposite end view is similar.

FIG. 12 is an end view of the bridging member of FIG. 9. The opposite end view is similar.

FIG. 18 is an end view of the bridging member of FIG. 15. The opposite end view is similar.

DETAILED DESCRIPTION OF THE INVENTION

Figure 1:
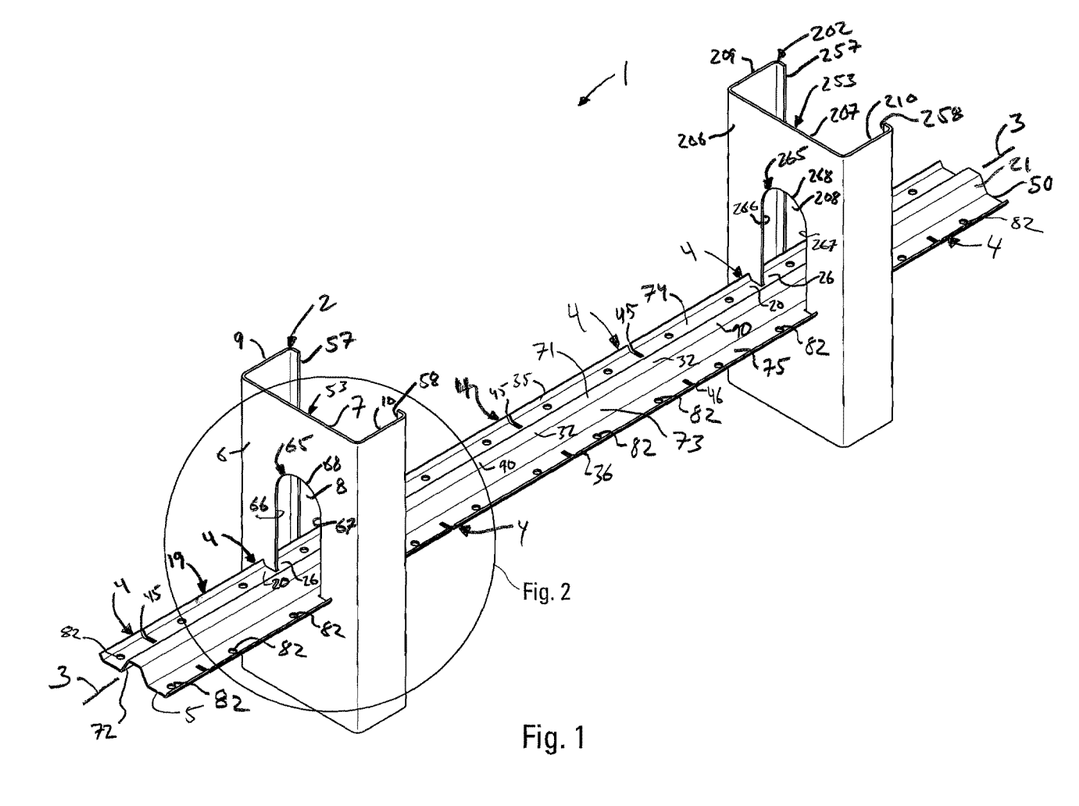
FIG. 1 is an upper front right perspective view of the present invention, showing a wall section with two typical cold-formed steel wall studs joined by the bridging member of the present invention.
Figure 8:
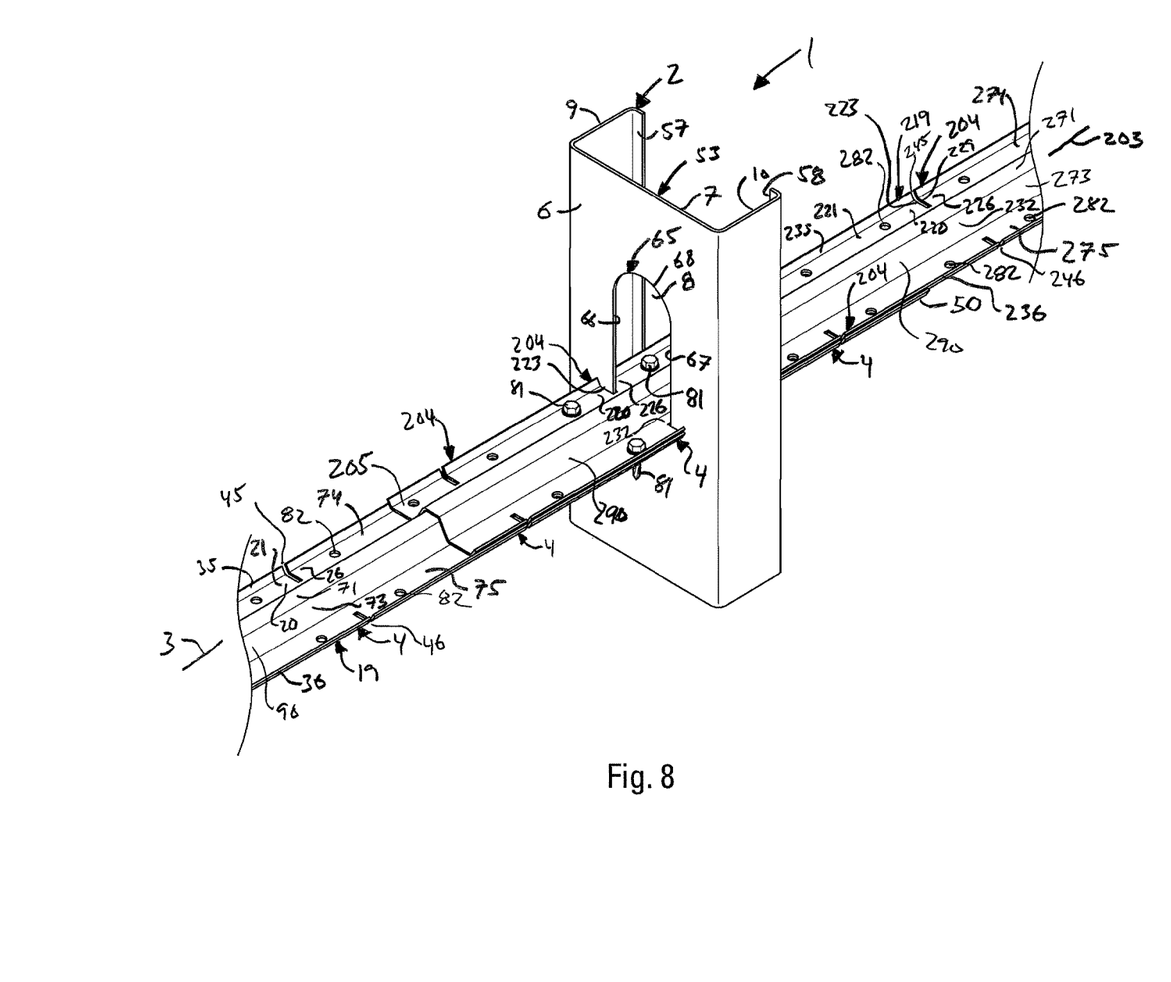
FIG. 8 is an upper front right perspective view of the present invention, showing a wall section with one typical cold-formed steel wall stud connected to two overlapping bridging members of the present invention.
Figure 9:
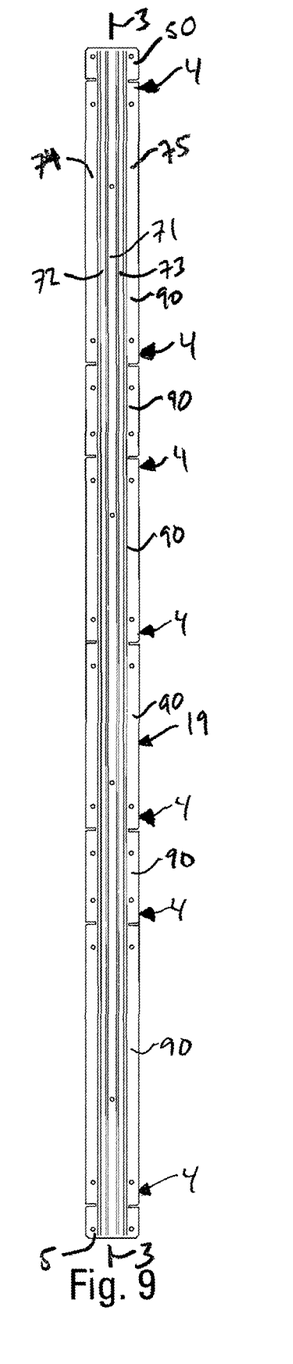
FIG. 9 is a top plan view of another form of the bridging member of the present invention.
Figure 10:
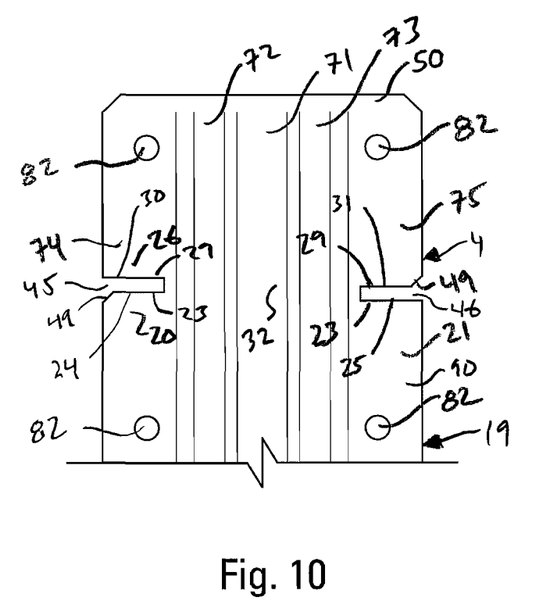
FIG. 10 is a top plan view of the end of the bridging member shown in FIG. 9.
Figure 11:
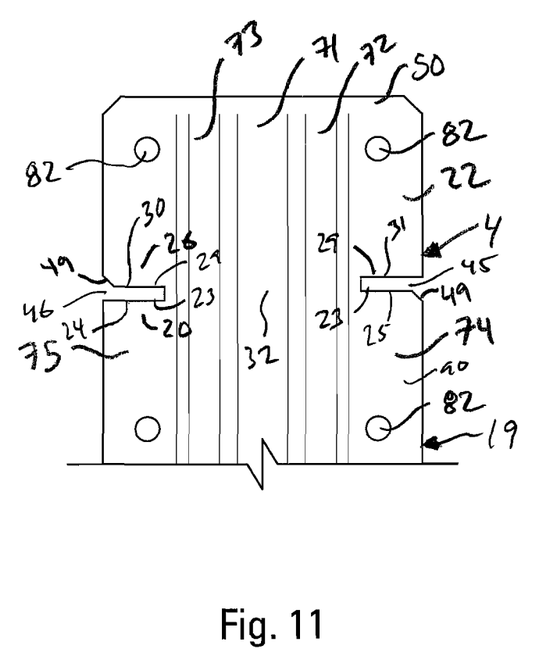
FIG. 11 is a bottom plan view of the end of the bridging member shown in FIG. 10.
Figure 12:
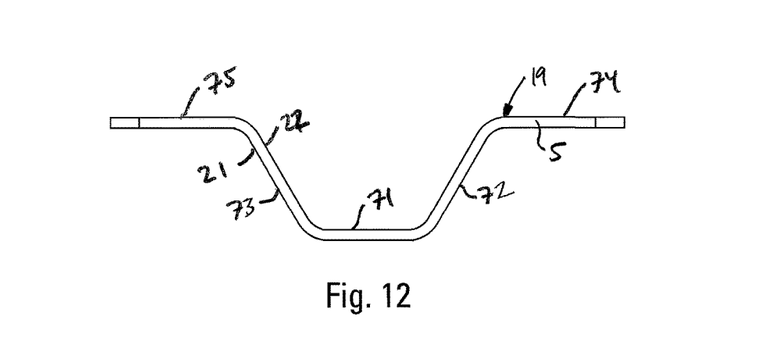
Figure 13:
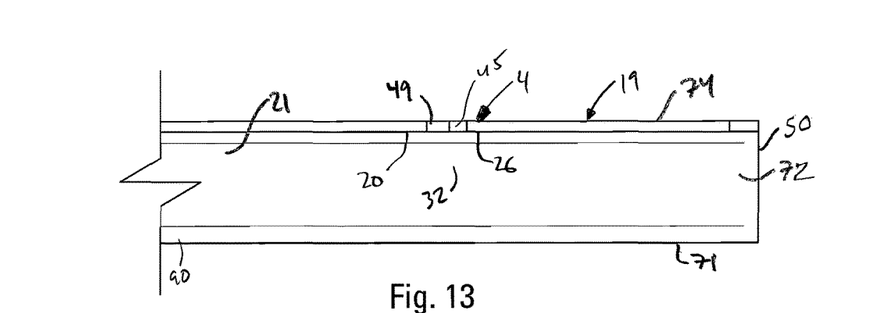
FIG. 13 is a right side elevation view of a portion of the bridging member of FIG. 9.
Figure 14:
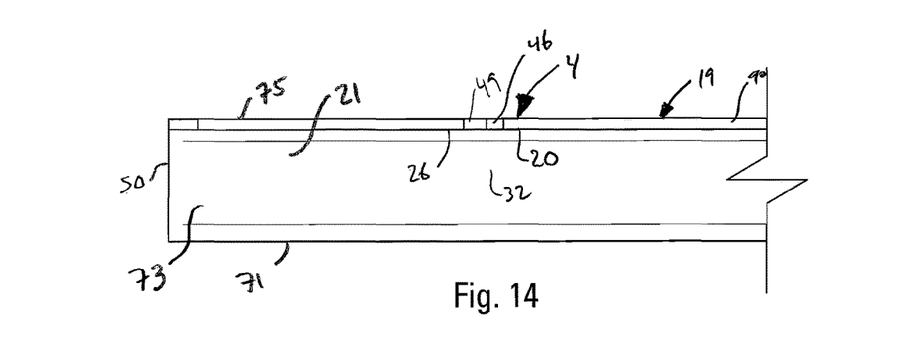
FIG. 14 is a left side elevation view of a portion of the bridging member of FIG. 9.
Figure 15:
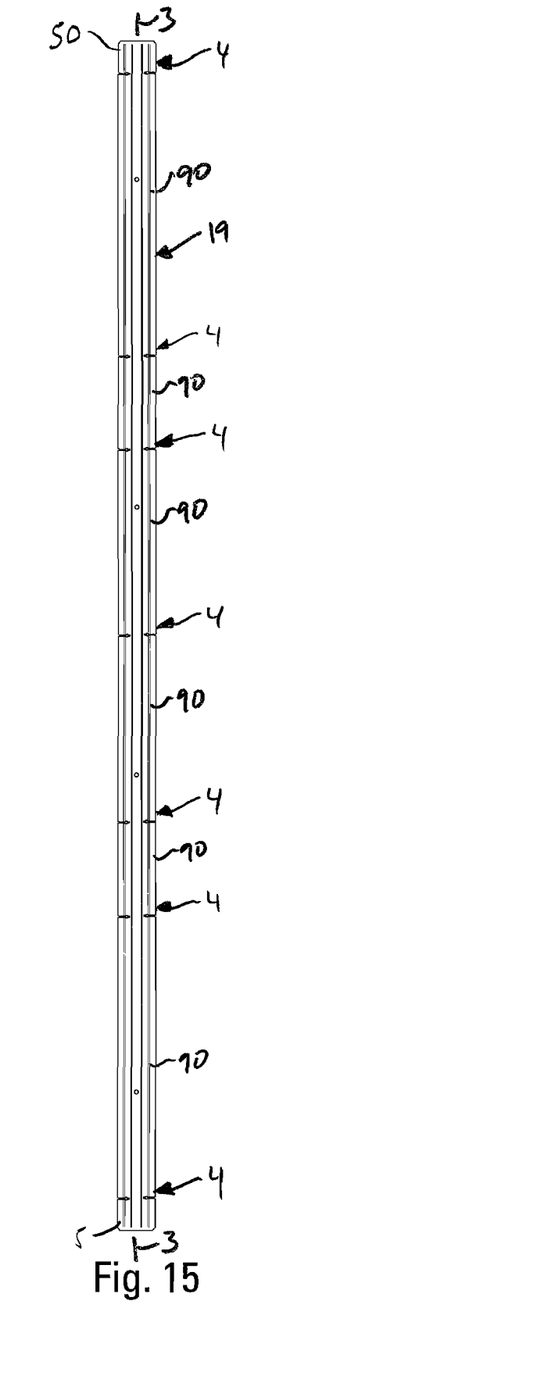
FIG. 15 is a top plan view of another form of the bridging member of the present invention.
Figure 16:
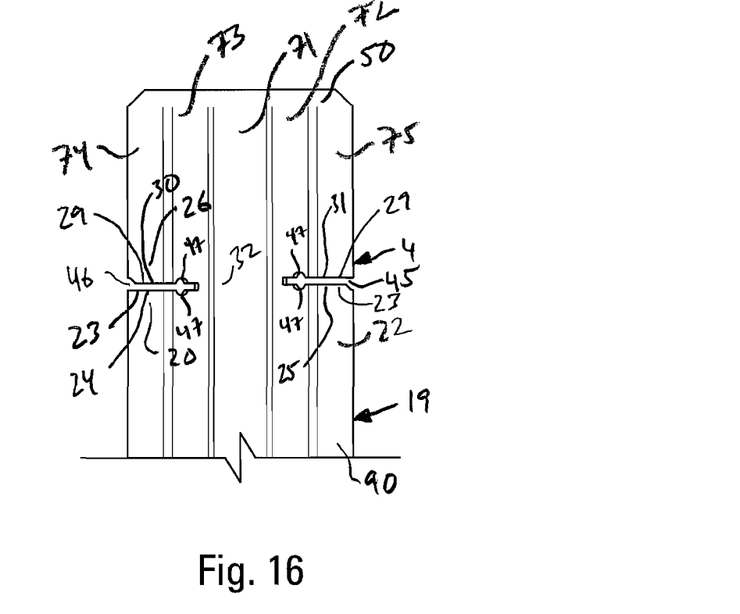
FIG. 16 is a bottom plan view of the end of the bridging member shown in FIG. 15.
Figure 17:
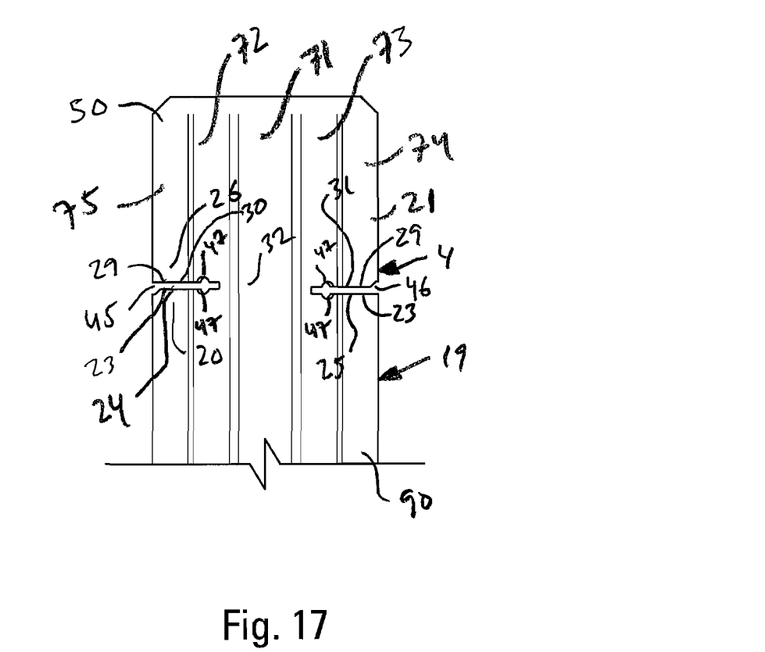
FIG. 17 is a top plan view of the end of the bridging member shown in FIG. 15.
Figure 18:
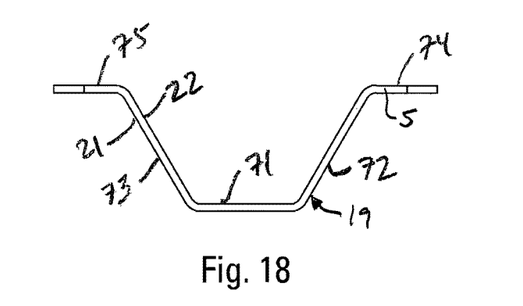
Figure 19:
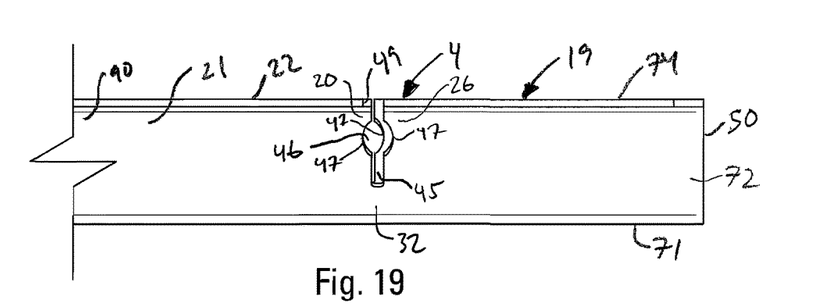
FIG. 19 is a right side elevation view of a portion of the bridging member of FIG. 15.
Figure 20:
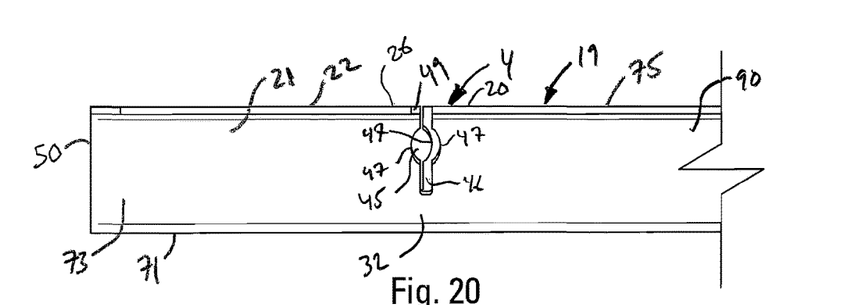
FIG. 20 is a left side elevation view of a portion of the bridging member of FIG. 15.

As shown in FIGS. 1 and 8, the present invention is a building connection 1 that comprises a plurality of substantially vertical wall studs 2 and 202 and one or more substantially horizontal, interconnected bridging members 19 and 219. The wall studs 2 and 202 are typically one of several sequentially-arranged, cold-formed steel studs 2 and 202 in the frame of a building wall. The bridging members 19 and 219 are separate, preferably cold-formed galvanized steel members that interface with the plurality of wall studs 2 and 202. The first and second bridging members 19 and 219 each have a longitudinal, central axis 3 and 203 that are preferably in alignment. Each bridging member 19 and 219 has a plurality of mounting sections 4 and 204 and opposed first and second end sections 5 and 25, and 205 and 225 at the ends of the bridging members 19 and 219.

FIG. 8 shows a first bridging member 19 and a second bridging member 219. Preferably, the first and second bridging members 19 and 219 are identical, although they need not be. The first bridging member 19 will be described in detail with numbering for the second bridging member being similar, except the number identifiers for the second bridging member are 200 units higher, for example the first end section 5 of first bridging member 19 is 5, and the first end section 205 of the second bridging member 219 is 205. A similar convention is adopted for the first and second studs 2 and 202.

As shown in FIG. 1, a mounting section 4 of the first bridging member 19 is received in the opening 8 of the first stud 2 and another mounting section 4 of the first bridging member 19 is received in the opening 208 of the second stud 202.

As shown in FIG. 8, a mounting section 4 of the first bridging member 19 is received in the opening 8 of the first stud 2 and a mounting section 204 of a second bridging member 219 is also received in the opening 8 of the first stud 2.

As shown in FIG. 1, the second end section 25 of the first bridging member 19 projects substantially away from the opposite face 7 of the first stud 2 and also from the opposite face 207 of the second stud 202, and the first end section 5 of the first bridging member 19 projects away from the front face 6 of the first stud 2 and extends away from the front face 206 of the second stud 202.

As shown in FIG. 8, the second end section 225 of the second bridging member 219 projects substantially away from the opposite face 7 of the first stud 2. The first end section 5 of the first bridging member 19 projects away from the front face 6 of the first stud 2. The first end section 5 of the first bridging member 19 is available to be connected to the second end section 225 of the additional bridging member 219.

In the preferred embodiment, the bridging members 19 and 219 are identical. Preferably, the first and second end sections 5 and 25, 205 and 225 of the first and second bridging members 19 and 219 are provided with channel shaped portions and the end sections nestingly engage. As shown in the drawings the second end sections 25 and 225 can be received within the first end sections 5 and 205 or vice versa. Preferably, the bridging members 19 and 219 are channel-shaped throughout their longitudinal length, having a web 71 and flaring side walls 72 and 73. The flaring side walls 72 and 73 are disposed at non-orthogonal angles to the web 71 and flare outwardly from the web 71. Connected to the flaring side walls 72 and 73 are outer flanges 74 and 75 that are preferably generally parallel to the web 71 and are preferably in alignment with each other, although the outer flanges can be offset from each other and need not be parallel.

As shown in FIGS. 1, 4, 5 and 7, the first bridging member 19 has a first end section 5. The bridging member 19 also has multiple first and second bodies 20 and 26. These members make up the multiple mounting sections 4. Transition sections 90 are provided between the mounting sections 4. Preferably, the transition sections 90 are shaped similarly to the mounting sections 4. The first bridging member 19 also has a second end section 25.

Preferably, the first and second bridging members 19 and 219 are made of 18 or 22 gage sheet metal, and the sheet metal of the first and second bodies 20 and 26, and 220 and 226, and the first and second ends 5 and 25, and 205 and 225 of the bridging members 19 and 219 can be embossed in order to stiffen the bridging members 19 and 219.

Preferably, the first body 20 and a second body 26 of the bridging members 19 are joined by a neck 32.

Figure 4:
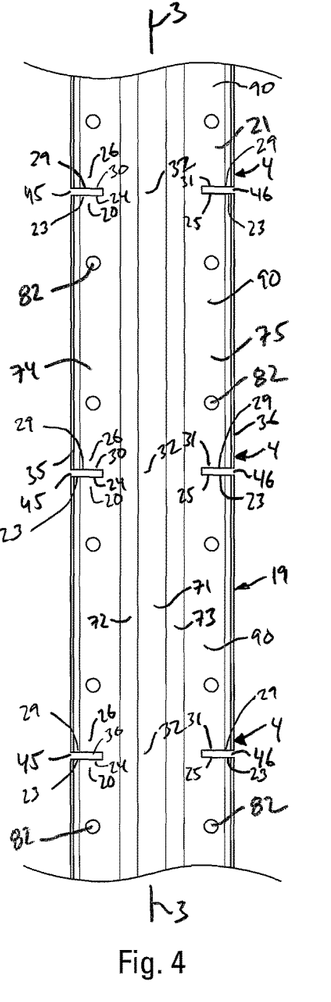
FIG. 4 is a top plan view of the bridging member of the present invention shown in FIG. 1.
Figure 5:
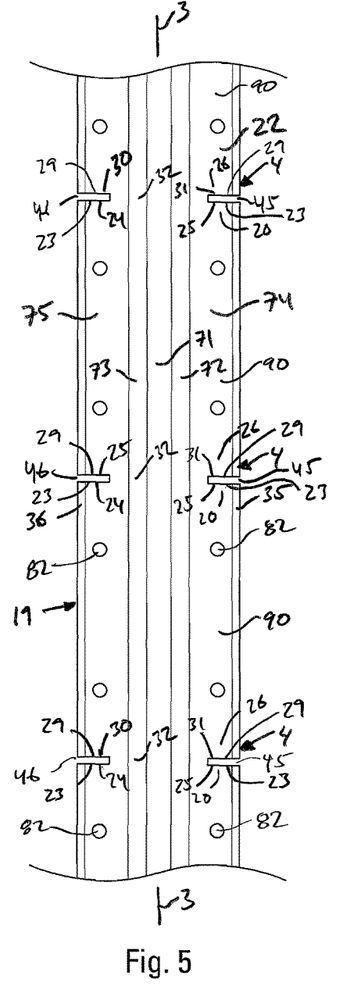
FIG. 5 is a bottom plan view of the bridging member of the present invention shown in FIG. 1.
Figure 6:
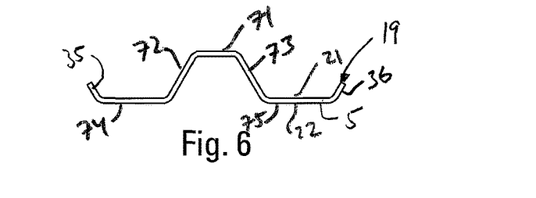

As shown in FIGS. 4, 5 and 6, the bridging connector 19 preferably has an upper surface 21, a lower surface 22 opposite the upper surface 21. The first body 20 has a first inner edge 23 with a first web interface portion 24 and a second web interface portion 25. The inner edge 23 of the first body 20 is preferably bounded by the upper surface 21 and the lower surface 22 proximate the first inner edge 23 of the first body 20. The second body 26 preferably has a first inner edge 29 with a first web interface portion 30 and a second web interface portion 31. The first inner edge 29 is preferably bounded by the upper surface 21 and the lower surface 22 proximate the first inner edge 29 of the second body 26. Preferably, the first inner edge 23 of the first body 20 and the first inner edge 29 of the second body 26 are substantially opposed. The first inner edges 23 and 29 are similarly oriented. The first and second bodies 20 and 26 preferably brace the first inner edges 23 and 29 against the central web 53 of the wall stud 2.

As shown in FIG. 5, the neck 32 preferably is disposed between the first inner edges 23 and 29, particularly between the first web interface portion 24 and the second web interface portion 25 of the first inner edge 23 and between the first web interface portion 30 and the second web interface portion 31 of the first inner edge 29.

Preferably, the neck 32 passes through the elongated opening 8 in the central web 53 of the wall stud 2. The first web interface portion 24 and the second web interface portion 25 of the first inner edge 23 of the first body 20 preferably interface with either the front face 6 or the opposite face 7 of the central web 53 of the wall stud 2. The first web interface portion 30 and the second web interface portion 31 of the first inner edge 29 of the second body 26 preferably interface with the other of the front face 6 and the opposite face 7 of the central web 53 of the wall stud 2. The neck 32 preferably is almost as wide as the typical elongate opening 8. Preferably, the first inner edges 23 and 29 of the most preferred embodiment is substantially wider than the opening 8 in central web 53 of the wall stud 2.

Figure 7:
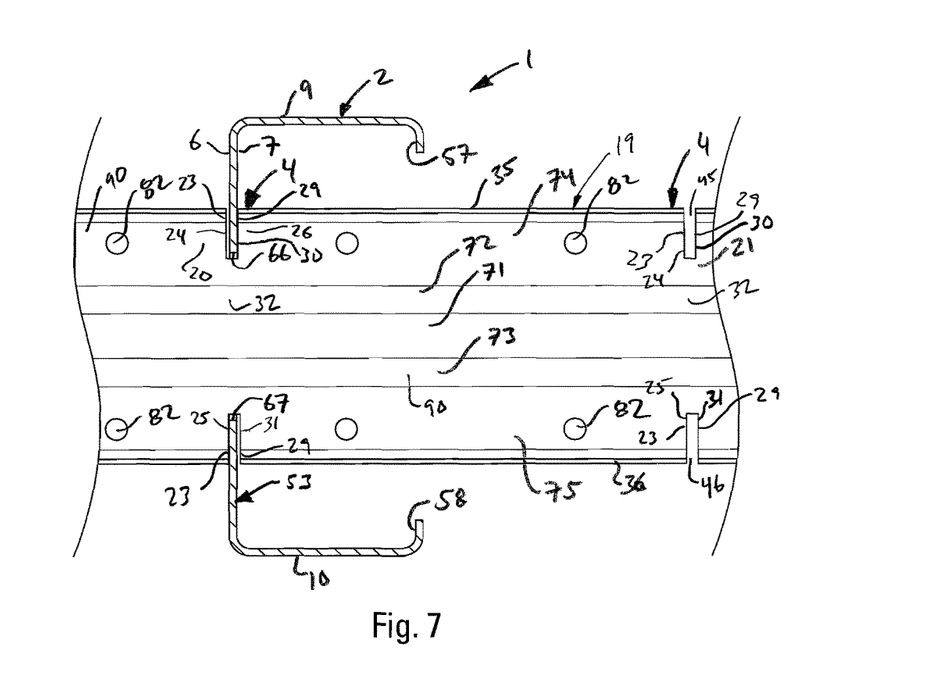
FIG. 7 is a top plan view of the connection of FIG. 1.

As best shown in FIGS. 4 and 5, the present invention employs a bridging connector 19 or 219 with longitudinally-offset notches 45 and 46 and 245 and 246 that create a tighter interface with the central web 53 of the wall studs 2 and 202 and therefore result in improved performance in the connection. This is accomplished by having the first web interface portions 24 and 30 of each of the inner edges 23 and 29 of the first and second bodies 20 and 26 be longitudinally offset from the second web interface portions 25 and 31 along the longitudinal axis 3 of the bridging member 19. As shown in FIG. 7, the first web interface portion 24 of inner edge 23 of the first body 20 is not aligned with second web interface portion 25.

As shown in FIGS. 16, 17, 19 and 20, the notches 45 and 46 can be formed in a special manner to preserve the die punch that forms the notches 45 and 46 in the mounting sections 4. Since the notches 45 and 46 can be quite thin, a correspondingly thin die punch is needed to form them, and thin die punches can be weak. To make the die punch larger and stronger, the notches 45 are formed such that they have portions that are wider. In particular inner side edges 23 and 29 have arced segments 47 where the inner edges 23 and 29 are not generally parallel but draw away from each other creating a larger spacing between inner edges 23 and 29.

As shown in FIGS. 16, 17, 19 and 20, the inner edges 23 and 29 of the first and second bodies 20 and 26 of the notches 45 and 46 can also be shaped so that one of the first and second inner edges 23 or 29 has a portion 49 that flares outwardly as it nears the outer end of the notch 45. This feature makes it easier to engage the notches 45 and 46 with the central web 53 of the stud 2.

FIG. 1 shows a first wall stud 2 and second wall stud 202. The central web 53 of first stud 2 is identified by the numeral 53, and the central web 253 of second wall stud 200 is 253. The first stud 2 includes a central web 3 having a front face 6 and an opposite face 7, and an opening 8 that communicates between the front face 6 and the opposite face 7. The central web 3 is typically rectangular and occupies a vertical plane. A first side flange 9 and a second side flange 10 are integrally attached to the web 53. The first and second side flanges 9 and 10 are typically rectangular and occupy vertical planes that are mutually parallel and are both orthogonal to the central web 53. The central web 53 or 253 of a wall stud 2 or 202 is typically 3.635 (3⅝), 6 or 8 inches wide, although there are wall studs 2 or 202 as narrow as 2.5 inches and as wide as 12 inches. The elongated opening 8 is typically 1.5 inches wide and 3.25 inches tall. The first and second side flanges 9 and 10 are typically 1.62 (1⅝) inches wide, although there are wall studs 2 and 202 with first and second side flanges 9 and 10 or 209 and 210 that are 2 inches wide and 2.5 inches wide. The second stud 202 is disposed substantially parallel to and spaced a selected distance away from the first stud 2.

As shown in FIGS. 1-8, a first stiffening flange 57 is attached to the first side flange 9, and a second stiffening flange 58 is attached to the second side flange 10. The wall studs 2 and 202 are generally channel-shaped.

Figure 2:
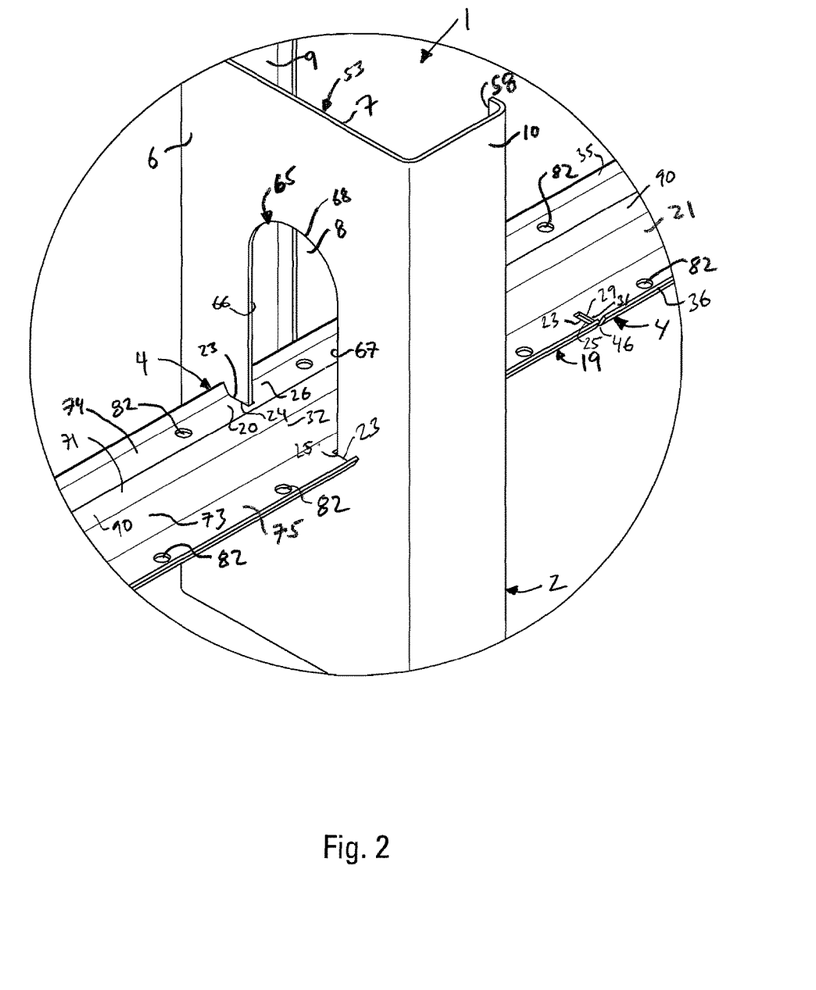
FIG. 2 is an upper front right perspective view of the present invention, showing a first bridging member inserted through a wall stud.
Figure 3:
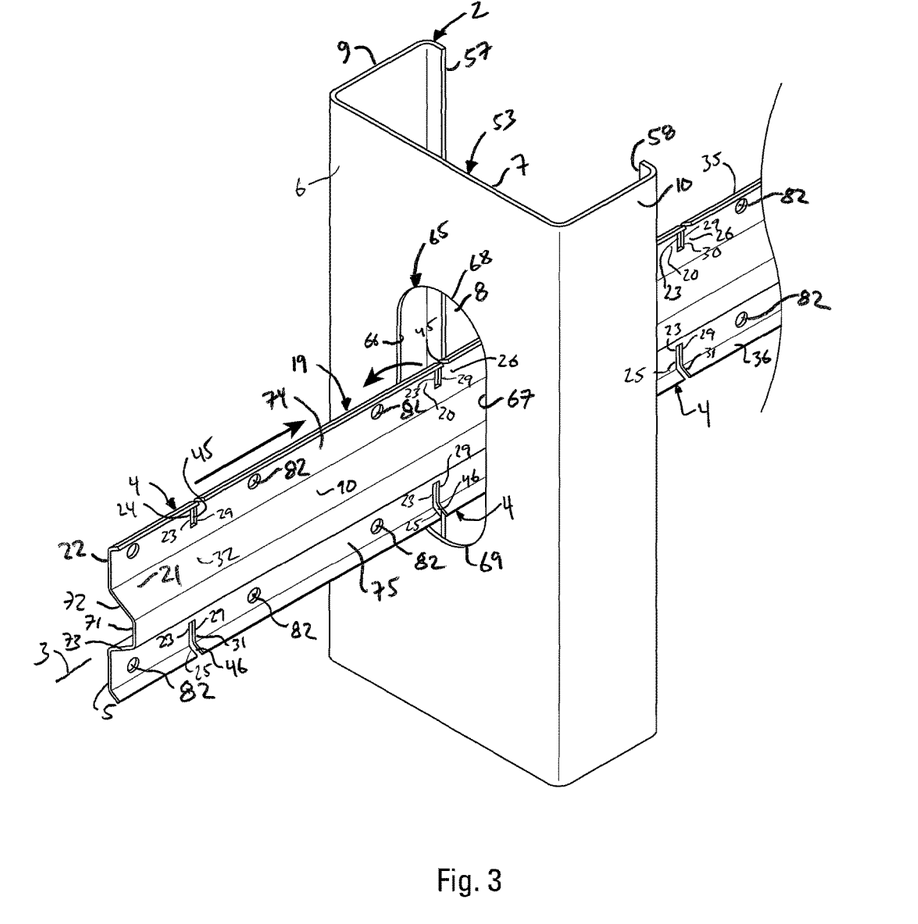
FIG. 3 is an upper front right perspective view of the present invention similar to FIG. 2, showing the first bridging member inserted through the wall stud but not yet engaging the central web of the wall stud. The first and second arrows show a possible direction for first inserting and then rotating the bridging member to engage the central web of the wall stud.

As shown in FIG. 2, typically, the elongated opening 8 in the central web 3 of the first wall stud 2 has an edge 65 with a first elongated portion 66 and a second elongated portion 67, which are mutually parallel and vertically-oriented, a first concave portion 68 that joins the first and second elongated portions 66 and 67 at the top of the elongated opening 8, and a second concave portion 69 that joins the first and second elongated portions 66 and 67 at the bottom of the elongated opening 8, opposite the first concave portion 68. This shape is variously referred to as obround, a racetrack, and super-oval when the concave portions 68 and 69 are generally semicircular.

As shown in FIG. 1, each bridging member 19 and 219 preferably is in engagement and extends through multiples openings 8 and 208 in multiple wall studs 2 and 202.

As shown in FIGS. 1-8, the first bridging member 19 can have a first side flange 35 and a second side flange 36. The first and second side flanges 35 and 36 of the bridging member are similarly notched and have opposed inner edges that contact or lie closely adjacent to the central web 53 of the wall stud 2.

The first and second side flanges 35 and 36 of the bridging member 19 of the present invention buttress the central web 53 where they interface with the central web 43. The first and second side flanges 35 and 36 are preferably straight. The first and second side flanges 35 and 36 can also be curved. The first and second side flanges 35 and 36, preferably project at an angle to the outer flanges 74 and 75 and are bent from the outer flanges 74 and 75.

Preferably, the connection 1 of the present invention is formed according to the following steps. First, a first bridging member 19 is preferably inserted through the elongated openings 8 and 208 in the central webs 3 and 203 of the vertical wall studs 2 and 202. Preferably, while it is being inserted, the bridging connector 19 is positioned so that the neck 32 of the bridging connector 19 is not orthogonal to the first and second elongated portions 66 and 67 of the elongated opening 8. Preferably, the bridging member 19 is rotated so that the neck 32 is orthogonal to the first and second elongated portions 66 and 67 of the elongated opening 8, the first web interface portion 24 and the second web interface portion 25 of the first inner edge 23 interface with the central web 3 of the wall stud 2, and the first web interface portion 30 and the second web interface portion 31 of the first inner edge 29 interface with the central web 3 of the wall stud 2. The first end section 5 of the first bridging member 19 can be connected to the second connecting section 225 of a second bridging member 219 which is received with one of its mounting sections 204 engaging the first stud 2.

The preferred fasteners 81 for joining the bridging members 19 and 219 are metal screws 81, as shown in FIG. 8. However, any sufficiently strong fastener 81 can be used, including welds. When screws 81 are used, the first end section 5 of the bridging connector 19 is preferably formed with one or more fastener openings 82 sized to closely accommodate the selected screws 81. All forms of the bridging connector 19 of the present invention are shown with fastener openings 82 along the bridging connector 19.

It is possible to use additional fasteners 81 and have additional fastener openings 82 elsewhere on the bridging member 19. Other attachments, with or without separate fasteners 81, welds, or the like are possible between the bridging members 19 and 219, but it is desirable to use the minimum number of fasteners 81 because this saves time and material and related costs.

In the preferred embodiment, the bracing members 19 and 219 are designed to attach to multiple studs 2 and 202 and to interconnect the studs 2 and 202.

I claim:

1. A connection between a first stud, a second stud, and a first bridging member, the connection comprising:
   a. said first stud having a front face and an opposite face disposed laterally therefrom on the opposed face of the first stud, the first stud having an opening therethrough that communicates between the front face and the opposite face of the first stud;
   b. said second stud having a front face and an opposite face disposed laterally therefrom on the opposed face of the second stud, said second stud being disposed substantially parallel to and spaced a selected distance away from said first stud, the second stud having an opening therethrough that communicates between the front face and the opposite face of the second stud;
   c. said first bridging member engaging the first and second studs and received in the openings of the first and second studs, the first bridging member having a longitudinal, central axis with a plurality of mounting sections and opposed first and second end sections at the ends of the bridging member along the longitudinal, central axis, wherein at least one of said mounting sections of said first bridging member have portions that are received in the opening of the first stud and said at least one of said mounting sections received in said opening have notches that receive portions of the central web of the first stud and at least one of said mounting sections of said first bridging member have portions that are received in the opening of the second stud and said at least one of said mounting sections received in said opening have notches that receive portions of the central web of the second stud, said second end section projecting substantially away from said opposite face of said first stud and also from said opposite face of said second stud, and said first end section of said first bridging member projecting away from said front face of said first stud and said front face of said second stud;
   d. said mounting section of said first bridging member received by said first stud having a first body, the first body of the mounting section having a first inner edge with a first web interface portion and a second web interface portion, the first inner edge contacting or being closely adjacent to the front face of said first stud,
   e. said mounting section of said first bridging received by said first stud having a second body joined to the first body by a neck that passes through the opening in the first stud, the second body of the mounting section having a first inner edge facing the opposite face of the first stud, the first inner edge having a first web interface portion and a second web interface portion, the first inner edge contacting or being closely adjacent to the opposite face of said first stud;
   f. said bridging member comprising a web and flaring side walls flaring outwardly from the web, and outer flanges connected to the flaring side walls, wherein the outer flanges include the notches.

2. The connection of claim 1, wherein: the bridging member is channel-shaped throughout its longitudinal length, wherein the flaring side walls are disposed at non-orthogonal angles to the central web.

3. The connection of claim 2, wherein:
the first bridging member can nestingly engage with a second bridging member when the longitudinal, central axis of the first bridging member is aligned with the longitudinal, central axis of the second bridging member.

4. The connection of claim 2, wherein: the outer flanges are generally parallel to the web and are in alignment with each other.

5. The connection of claim 4, wherein:
the first bridging member can nestingly engage with a second bridging member when the longitudinal, central axis of the first bridging member is aligned with the longitudinal, central axis of the second bridging member.

6. The connection of claim 4, wherein:
first and second side flanges are connected to the outer flanges with the first and second side flanges being angled with respect to the outer flanges.

7. The connection of claim 6, wherein:
the first bridging member can nestingly engage with a second bridging member when the longitudinal, central axis of the first bridging member is aligned with the longitudinal, central axis of the second bridging member.

8. The connection of claim 6, wherein: a first side flange of the bridging member has an inner edge that contacts or lies closely adjacent to the central web of the first stud.

9. The connection of claim 8, wherein: a second side flange of the bridging member has an inner edge that contacts or lies closely adjacent to the central web of the first stud.

10. The connection of claim 1, wherein:
the first web interface portions of each of the inner edges of the first and second bodies are longitudinally offset from the second web interface portions along the longitudinal axis of the bridging member.

11. The connection of claim 10, wherein:
the bridging members are channel-shaped throughout their longitudinal length, having a web and flaring side walls, the flaring side walls are disposed at non-orthogonal angles to the central web and flare outwardly from the web.

12. The connection of claim 11, wherein:
the first bridging member can nestingly engage with a second bridging member when the longitudinal, central axis of the first bridging member is aligned with the longitudinal, central axis of the second bridging member.

13. The connection of claim 12, wherein:
outer flanges are connected to the flaring side walls, and the outer flanges are generally parallel to the web and are in alignment with each other.

14. The connection of claim 1, wherein:
a. the inner side edges of the first and second bodies are generally parallel, and
b. the inner side edges of the first and second bodies have arced segments where the inner edges are not generally parallel but draw away from each other creating a larger spacing between the generally parallel inner edges of the first and second bodies.

15. The connection of claim 14, wherein:
the bridging members are channel-shaped throughout their longitudinal length, having a web and flaring side walls, the flaring side walls are disposed at non-orthogonal angles to the central web and flare outwardly from the web.

16. The connection of claim 15, wherein:
the first bridging member can nestingly engage with a second bridging member when the longitudinal, central axis of the first bridging member is aligned with the longitudinal, central axis of the second bridging member.

17. The connection of claim 16, wherein:
outer flanges are connected to the flaring side walls, and the outer flanges are generally parallel to the web and are in alignment with each other.

18. The connection of claim 14, wherein:
the first web interface portions of each of the inner edges of the first and second bodies are longitudinally offset from the second web interface portions along the longitudinal axis of the bridging member.

19. The connection of claim 1, wherein:
the inner edges of the first and second bodies define the notches in the mounting sections and are shaped so that one of the first and second inner edges flares outwardly as it nears the outer end of the notch.

20. The connection of claim 1, wherein:
a. a second bridging member engages the first stud and is received in the opening of the first stud, the second bridging member having a longitudinal, central axis with a plurality of mounting sections and opposed first and second end sections at the ends of the second bridging member along the longitudinal, central axis, wherein one of said mounting sections of said second bridging member has portions that are received in the opening of the first stud and said mounting section received in said opening has notches that receive portions of the web of the first stud, said second end section projecting substantially away from said opposite face of said first stud, and said first end section of said second bridging member projecting away from said front face of said first stud; and wherein
b. fasteners join the first and second bridging members together.

* * * * *